(12) United States Patent
Blount

(10) Patent No.: US 6,423,250 B1
(45) Date of Patent: *Jul. 23, 2002

(54) FLAME RETARDANT COMPOSITIONS UTILIZING A MIXTURE OF CYANURIC ACID AND CYAMELIDE COMPOUNDS

(76) Inventor: David H. Blount, 6728 Del Cerro Blvd., San Diego, CA (US) 92120

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/648,422

(22) Filed: Aug. 28, 2000

Related U.S. Application Data

(60) Continuation-in-part of application No. 09/149,847, filed on Sep. 8, 1998, now Pat. No. 6,258,298, which is a division of application No. 08/723,779, filed on Sep. 30, 1996, now Pat. No. 5,854,309.

(51) Int. Cl.[7] ............ C09K 21/00; C09K 21/02; C09K 21/06; C09K 21/14
(52) U.S. Cl. ............ 252/607; 252/608; 252/609; 252/601; 528/259; 528/94; 523/179
(58) Field of Search .................. 252/609, 608, 252/607, 601; 525/428; 528/259; 523/179; 521/94, 95; 564/1.5, 8, 12, 32, 38, 39, 45, 58, 59

(56) References Cited

U.S. PATENT DOCUMENTS

| | | | | |
|---|---|---|---|---|
| 3,779,861 A | * | 12/1973 | Jones | |
| 3,979,341 A | * | 9/1976 | Widmann | |
| 5,010,113 A | * | 4/1991 | Blount | 521/107 |

* cited by examiner

Primary Examiner—Joseph D. Anthony

(57) ABSTRACT

Flame retardant compositions of this invention are produced by applying on or incorporating a mixture of cyanuric acid and cyamelide composition in a more flammable organic material. The mixture of cyanuric acid and cyamelide compounds are produced by heating urea or heating urea with biuret. The mixture of cyanuric acid and cyamelide compounds may be used alone or may be mixed with or reacted with carbonization auxiliaries, reacted with aldehydes and mixed with metal containing compounds, carbonization accelerators, heat reflexing compounds and fillers to produce a cyanuric acid and cyamelide composition which is applied on or incorporated in a more flammable organic compositions such as polyurethanes, polyester resins, epoxy resins, vinyl resins and other resins. The cyanuric acid and cyamelide salts of phosphorus, boron or sulfur containing compounds and the cyanuric acid and cyamelide aldehyde resins may also be used as the flame retardant compound in this invention. For example, polyurethane foams can be rendered less flammable with the cyanuric acid and cyamelide compounds or compositions and utilized as cushion and insulating materials.

20 Claims, No Drawings

US 6,423,250 B1

FLAME RETARDANT COMPOSITIONS UTILIZING A MIXTURE OF CYANURIC ACID AND CYAMELIDE COMPOUNDS

This application is a continuation in part of patent application Ser. No. 09/149,847 filed Sep. 8, 1998 now U.S. Pat. No. 6,258,298 which is a division of patent application Ser. No. 08/723,779 filed Sep. 30, 1996 now U.S. Pat. No. 5,854,309.

FIELD

The invention concerns urea being condensated with itself to produce cyanuric acid and cyamelide. The invention also concerns their preparation and use. These condensation compounds are useful to produce flame retardant plastics, to flame retard natural products, and may be reacted with phosphorus and/or boron containing compounds to produce other flame retardant compounds. These condensation compounds may also be reacted with aldehydes to produce cyanuric acid and cyamelide resins for use as molding compounds, as an adhesive, coating resin or as a flame retardant compound.

BACKGROUND

The heating of urea to produce urea condensation compounds, such as biuret and a mixture of cyanuric acid and cyamelide, is known in the arts, but the further condensation of flame retardant urea and buiret to produce a mixture of cyanuric acid and cyamelide which are improved flame retardant compounds is novel. The condensation of isocyanuric acid and/or cyanic acid, (which are produced by heating urea), produces the flame retardant, cyanuric acid and cyamelide compounds, is novel. The mixture of cyanuric acid and cyamelide compounds and their phosphorus and/or boron salts may be used as flame retardant compounds in plastics and natural products. Urea and melamine were utilized as a flame retardant compound by Fracalossi, et al., in U.S. Pat. No. 4,385,131. Melamine was utilized as flame retardant compounds in polyurethanes by Yukuta, et al., in U.S. Pat. No. 4,221,875 and by Grinbergs et al., in U.S. Pat. No. 4,745,133. Amino phosphates was utilized by Blount in U.S. Pat. No. 5,010,113.

What is lacking and what is needed are useful, safe and inexpensive flame retardant compound mixture of cyanuric acid and cyamelide. The urea condensation compounds, cyanuric acid and cyamelide, and their aldehyde resins are novel flame retardant compounds. What is additionally lacking are compositions having the urea condensation compounds, cyanuric acid and cyamelide, and/or their salts employed therein.

SUMMARY

In one aspect, the invention comprises of the flame retardant mixture of cyanuric acid and cyamelide. Another aspect of the invention is a process to prepare a, mixture of cyanuric acid and cyamilide by heating and reacting:

(A) urea with itself or biuret;
under conditions sufficient to prepare the urea condensation mixture of cyanuric acid and cyamelide. The urea is first heated to produce isocyanuric acid and/or cyanic acid then reacted with urea to form biuret then further heated to form a mixture of cyanuric acid and cymelide.

In another aspect, the invention comprises cyanuric acid and cyamelide salts of phosphorus and/or boron containing compound and a process to prepare cyanuric acid and cyamelide salts of a phosphorus and/or boron containing compound employing phosphorus and/or boron containing compound that will react with the mixture of cyanuric acid and cyamelide under conditions sufficient to prepare the cyanuric acid and cyamelide salt of a phosphorus and/or boron containing compound, comprising serially contacting, heating and reacting:

(A) urea with itself;
(B) phosphorus and/or boron containing compound that will react with an amino condensation compound;
   component A is first heated with itself or with biuret sufficient to produce cyanuric acid and cyamelide then component B is added and reacted.

An addition aspect of this invention is the production of a mixture of cyanuric acid-aldehyde and cyamelide-aldehyde resins, and a process to prepare a mixture of cyanuric acid and cyamelide-aldehyde resins under conditions sufficient to prepare the mixture of cyanuric acid-aldehyde and cyamelide-aldehyde resins comprising serially contacting, heating and reacting:

(A) a mixture of cyanuric acid and cyamelide produced by heating urea;
(C) aldehyde; and a
(D) a basic or acidic catalyst;

An additional aspect of the invention is use of the mixture cyanuric acid and cyamelide compounds, cyanuric acid and cyamelide salts of phosphorus and/or boron compounds and cyanuric and cyamelide-aldehyde resins as flame retardant compounds. The flame retardant use comprises contacting a more flammable organic material with the mixture of cyanuric acid and cyamelide and/or cyanuric acid and cyamelide salts of phosphorus and/or boron containing compounds and/or cyanuric acid and cyamelide-aldehyde resins thereof under conditions sufficient to lower the combustibility of the otherwise more flammable organic material, for example plastics, natural products or polyurethanes. Thus, a further aspect of the invention is a flame-retardant composition comprising a more flammable organic material incorporated therewith or applying on a flame retardant amount of a mixture of cyanuric acid and cyamelide and/or a mixture of cyanuric acid and cyamelide salts of a phosphorus and/or boron containing compound, and/or cyanuric acid and cyamelide-aldehyde resin, carbonization auxiliaries, metal compounds that accelerates the carbonization process, heat reflecting compounds and fillers.

The flame-retardant compounds of this invention are produced by heating urea (Component A) with urea or biuret to above the melting point of urea to about 160 degree C. at ambient pressure for 0.1–3 hrs. Upon heating above the melting point urea forms a very reactive compound isocyanic acid which will react with itself or other urea or other organic or inorganic nitrogen containing compounds especially amino compounds. In order to increase the flame retardant properties and carbonization properties of the mixture of cyanuric acid and cyamelide compounds, a carbonization auxiliary, such as, phosphorus acidic compounds, or organic phosphorus compounds that will react with an amino compound; boric acid, etc., is added to the melted cyanuric and cyamelide compounds mixed and/or reacted. Other carbonization auxiliaries may be mixed with the mixture of cyanuric acid and cyamelide compounds such as urea phosphate, melamine phosphate, magnesium phosphate, etc., to produce the flame retardant cyanuric acid and cyamelide composition. The mixture of cyanuric acid and cyamelide may be further reacted with an aldehyde in the presence of a neutral or basic or acidic catalyst by mixing and heating the mixture of cyanuric acid and cyamelide compounds with the aldehyde, usually in an aqueous medium, to just below the boiling point of the components at ambient or an elevated pressure thereby producing a cyanuric acid and cyamelide-aldehyde resin. Carbonization auxiliaries may be added to the mixture of cyanuric acid and cyamelide compounds or the cyanuric acid and cyamelide-aldehyde resin. The mixture of cyanuric acid and cyamelide compounds and cyanuric acid and cyamelide-aldehyde resins with or without carbonization auxiliaries and fillers may be reacted with or added to or applied on a more flammable organic material.

It is preferable to produce the mixture of cyanuric acid and cyamelide by utilizing urea which is heated sufficent to produce a mixture of cyanuric acid and cyamelide.

Component A

Urea is utilized as component A and may be in the form of a powder, crystals or a solid. Any suitable urea may be utilized that will condensate when heated to form a mixture of cyanuric acid and cyamelide. The mixture is utilized in the amount of 100 parts by weight when reacted with another compound.

Component B

Any suitable aldehyde may be reacted with the cyanuric acid and cyamelide compounds. Suitable aldehydes include, but not limited to, formaldehyde, paraformaldehyde, acetoaldehyde, butyraldehyde, chloral, and other alkyl aldehydes, furfural, benzyl aldehyde and other aromatic aldehydes. Aqueous formaldehyde is the preferred aldehyde. The aldehyde is utilized in the amount of 0 to 200 parts by weight. When it is utilized it is used in the amount of 25 to 100 parts by weight.

Component C

Any suitable carbonization auxiliaries may be utilized in this invention. Suitable carbonization auxiliaries are compounds that in the presence of fire assist the formation of a carbonization foam or char, such as, additives that produce acidic components in the pyrolysis mixture, such as phosphorus acids, boric acids or sulfuric acids. These acidic components are compounds such, for example, acids or salts, or their derivatives of sulfur, boron and phosphorus, such as, boron-phosphates, phosphates, and polyphosphates of ammonia, amines, polyamines, amino compounds, thioureas and alkyanolamines, but boric acid and its salts and their derivatives, organic phosphorus compounds and their salts, halogenated organic phosphorus compounds, their salts and their derivatives may also be used for this purpose. The carbonization auxiliaries and other flame retardant agents may be used in quantities of 0 to 300 parts by weight. The carbonization auxiliaries and other flame retardant agents are not a necessary component but when used is used in an amount of 5 to 300 part by weight.

The nitrogen containing salts of phosphorus acids are the preferred carbonization compounds, such as amino phosphate, amino salts of organic phosphorus compounds and amino condensation salt of inorganic and organic phosphorus compounds. The condensation salt of phosphorus compounds are produced by contacting a mixture of cyanuric acid and cyamelide with a phosphorus containing compound that will react with an amino compound, under conditions sufficient to prepare a cyanuric acid and cyamelide salts of a phosphorus containing compound. Suitable inorganic phosphorus compounds include, but not limited to, phosphoric acid, pyrophosphoric acid, triphosphoric acid, metaphosphoric acid, phosphorous acid, hydrophosphorous acid, phosphinic acid, phosphinous acid, phosphine oxide, phosphorus trihalides, phosphorus oxyhalides, phosphorus oxide, mono-metal hydrogen phosphates, ammonia dihydrogen phosphate, bromated phosphates, alkali metal dihydrogen phosphate and halogenated phosphate-phosphite and their halides and acids organic phosphorus compounds include, but not limited to, alkyl, cyclic, aryl and alkyl-aryl phosphorus compounds, such as, alkylchlorophosphines, alkyl phosphines, alkyl phosphites, dialkyl hydrogen phosphites, dialkyl alkyl phosphonates, trialkyl phosphites, organic acid phosphates, organic diphosphonate esters, aryl phosphites, aryl hydrogen phosphates, halogenated phosphonates esters and mixtures thereof. Cyanuric acid and cyamelide borates may be produced by contacting boric acid and a mixture of cyanuric acid and cyamelide compounds under conditions sufficient to prepare the mixture of cyanuric acid and cyamelide borates which may also be utilized as a flame-retardant compound. A mixture of cyanuric acid and cyamelide salt of boron-phosphates may be produced by contacting boron-phosphates and a mixture of cyanuric acid and cyamelide compounds under conditions sufficient to prepare cyanuric acid and cyamelide salts of boron-phosphate compounds which may also be utilized as a flame-retardant compound. The salt forming phosphorus containing compounds will react with the mixture of cyanuric and cyamelide compounds to form cyanuric acid and cyamelide salts of a phosphorus containing compound.

Component D

Any suitable metal-containing compound that will accelerate carbonization effect used in this invention increases the amount of carbonization residue after combustion, thereby enhancing the flame retardant effect and may be used in this invention. These compounds include, but not limited to, alkaline earth metal borates such as magnesium borate, calcium magnesium borate and the like, manganese borate, zinc borate, metal oxides of titanium oxide, tin oxide, nickel oxide, zinc oxide and the like, ferrocene, dimethylglyoxime copper, acetyl-acetonatocooper, hydroxyquinoline nickel and the like, zinc thiocarbamate compounds such as zinc dimethylthio-carbamate, zinc di-n-butyidithiocarbamate and the like, mercaptobenzothiazole zinc compounds such as mercaptobenzothiazole zinc and the like, salicyadehyde zinc compounds such as salicylaldehyde zinc and the like, metal hydroxides such as aluminum hydroxide, magnesium hydroxide, calcium magnesium hydroxide, zirconium hydroxide and the like and mixtures thereof. The most preferable compounds are selected from zinc oxide, zinc thiocarbamates, the mercaptobenzothiazole zinc compounds the salicyaldehyde zinc compounds, zinc borate and the alkaline earth metal borates. The are utilized in the amount of 0 to 30 parts by weight.

Component E

Any suitable compound that will reflect heat compound such as titanium oxide may be used in this invention and used in the amount of 0 to 30 part by weight.

Component F

Any suitable filler may be used in this invention. The fillers that may be utilized in the flame retardant mixture are usually insoluble in the reaction mixtures. They may be inorganic substances, such as, alkali metal silicates, alkaline earth metal silicates, metal silicates, silica, metals, oxides, carbonates, sulphates, phosphates, borates, glass beads or hollow glass beads. Hydrated aluminum oxide is preferred. They may be organic substances, such as, amino compounds, such as urea, melamine, dicyandiamide, and other amino derivatives or their formaldehyde resins, amino phosphates, amino salts of organic phosphates, phenolaldehyde resin powder, powdered coke, graphite, graphite compounds and mixtures thereof. The organic halide flame retardant compounds may also be added as fillers. The filler may be used in the amount of 0 to 300 percentage based on the weight of the partially hydrolyzed amino condensation compound.

Component G

Any suitable basic or acidic catalyst may be used in the reaction of amino condensation compounds with aldehydes. Suitable basic compounds include but not limited to, compounds containing alkali metal, alkaline earth metal and ammonia radicals and mixture thereof. Suitable acidic compounds include, but not limited to,halogen acids, acidic phosphorus containing compounds, acidic compounds containing sulfur, sulphonic acid, halides, carboxylic acids, polycarboxylic acids, nitric acids and mixtures thereof. In some reactions basic or acidic catalytic are not necessary. A catalytic amount is utilized.

Component H

Any suitable organic material which is more flammable than the mixture of cyanuric acid and cyamelide, its salts and cyanuric acid and cyamelide-aldehyde resins may be used in this invention. Any suitable plastic resin composition or mixtures thereof and any suitable natural organic material maybe used in this invention and mixtures thereof. These materials may be in the form of a solid, cellular suspension, emulsion or solution. Suitable plastic resin include, but not limited to, vinyl dienes, vinyl-diene copolymers, polyesters, polyester resins, phenoplasts, aminoplasts, polyepoxy resins, polyurethanes, furans, polyamides, polyimides, polycarbonates, homopolymers of such olefins as ethylene, propylene, and butylene; block copolymers, consisting of optional combination of these olefins; polymers of vinyl compounds such as vinyl chloride, acrylonitrile, methyl acrylates, vinyl acetates and styrene; copolymers of the foregoing olefins with vinyl monomers, copolymers and terpolymers of the foregoing olefins, with diene compounds; polyesters such as polyethylene terephthalate, polyester resins; polyamides such as nylon; polycarbonates, polyoxymethylene, silicones, polyethers, thioplasts, polytetrafluoroethylene, polysulfones, vinyidienes, poly (vinyl acetate), aliphatic allyl compounds, polyacrylonitrile, aliphatic dienes, polybutadiene, butadiene-acrylonitrile, butadiene-styrene copolymers, aromatic vinyl compounds, heterocyclic vinyl compounds, cyclic unsaturated compounds, urethane-epoxy resins, polyimides, urethane silicates, cellulose nitrate rayon, regenerated cellulose film cellulose acetate, cellulose esters, cellulose ethers, cyanoethyl cellulose, chlorinated rubber and mixtures thereof.

Suitable natural products include but not limited to wood, cellulose, lignin-cellulose, paper, cotton, wool, linen, dammars, copols, other natural resins, rosins, lignin, natural rubber, natural proteins, e.g., soya bean protein, silk, glues, gelatin, etc.; modified cellulose and mixtures thereof. Natural organic material and plastics may be mixed together. The mixture of cyanuric acid and cyamelide compounds, and/or its salts, and/or cyanuric acid and cyamelide-aldehyde resins or cyanuric acid, and/or cyamelide compositions maybe utilized in the amount of 3–200 percent, percentage based on the weight of the more flammable organic material.

ILLUSTRATIVE EMBODIMENTS

In general, the mixture of cyanuric acid and cyamelide are compounds which are produced by heating urea with urea or biuret. The heated urea first form isocyanic acid and/or cyanic acid which polymerizes with itself and when heated sufficient form a mixture of cyanuric acid and cyamelide.

Any amount of the mixture of cyanuric acid and cyamelide and/or its salts, and may include carbonization auxiliaries, metal carbonization accelerators, heat reflectors and fillers suitable for this invention, may be utilized. Preferably, flame retardant amounts of the mixture of cyanuric acid and cyamelide compounds and/or its salts and/or the cyanuric acid and cyamelide-aldehyde resins and/ or the cyanuric acid and cyamelide composition are from 3 percent by weight to about 200 percent by weight of the more flammable organic materials such as polyester resins, polyepoxy resins, polyurethane components, acrylic and acrylate resins, polyacrylonitrile, polystyrene, etc.

One method to measure this flame retardant capability is an oxygen index test. By selecting the various combinations of the mixture of cyanuric acid and cyamelide compositions to incorporate into a more flammable organic material the average limiting oxygen index (LOI) can be raised 10 to 30 percent or more when compared to otherwise comparable samples without the flame retardant mixture of cyanuric acid and cyamelide composition. For example the LOI of three flexible polyurethane foams with the mixture of cyanuric acid and cyamelide composition were raised more than 30 percent to a LOI of 31.7, 30.3 and 30.7.

When the mixture of cyanuric acid and cyamelide composition was incorporated into rigid polyurethane foam and tested with a propane torch with a 2" flame held against the foam for one minute, the flame did not spread, the foam melted and/or a char was formed. The flame went out when the torch was removed.

Various mixtures of cyanuric acid and cyamelide compositions were incorporated into liquid resins then cured into a solid in the form of a 1/8"×2"×6" sample, for example, flexible polyepoxy resins, rigid polyepoxy resins, polyester laminating and flexible resin, polystyrene resin, polymethyl methyl acrylate resin, polyvinyl acetate resin, polyurethane, polyisoprene, polyethylene, acrylonitrile, etc, then tested with a propane torch having a 2" flame, and held against the sample for one minute, the flame did not spread, and went out when the flame was removed. Various mixture of cyanuric acid and cyamelide compounds or compositions was add to aqueous emulsions and organic solutions of the above plastics then dried to form a test sample, then tested as above. The meltable plastics above was melted and the various mixture of cyanuric acid and cyamelide compounds or compositions were incorporated into the melted plastics then molded into a test sample and tested as above. The said above material were tested without the mixture of cyanuric acid and cyamelide composition and all burned.

The flexible flame retardant polyurethane foams were tested and passed the Calif. TB 133 test which utilizes a 100 gms of wood in the form of a crib being burned on top of the flexible foam. If more than 60 gms of the foam bums away it fails this test.

Various natural products such as wood shingles, paper, cotton cloth, and cardboard were coated with various cyanuric acid and cyamelide compositions in an aqueous emulsion containing 20% by weight of the powdered mixture of cyanuric acid and cyamelide condensation composition with or without adhesives, then after the product had dried, they were tested by applying a 2" flame from a propane torch against the products, and the flame did not spread whereas the non coated products caught on fire and burned.

DESCRIPTION OF PREFERRED EXAMPLES

The present invention will now be explained herein-after by way of a few examples and comparative examples, these examples setting, however, no limits to this invention. Parts and percentages are by weight, unless otherwise indicated.

Example 1

Two-three heated moles of ammonia to one mol of heated carbon dioxide, heated at 160° to 210° C. is forced through a reactor which has an aqueous solution or oil-water slurry of ammonia and carbon dioxide which is being circulated at 160° to 210° C. and under 2–6000 psi to form ammonium carbamate which when heated lose 1 mol of water thereby producing urea. The aqueous solution of urea is heated to remove the water then further heated above the melting point of urea (130° to 160° C.) for 0.1 to 3 hours thereby producing a mixture of cyanuric acid and cyamelide. Ammonia evolves from the heated mixture.

Example 2

100 parts by weight of powdered urea is heated to 130° to 160° C. for 30 minute then cooled and pulverized into a powder.

Example 3

About 100 parts by weight of urea beads are then heated to 130–160 degrees C., and heated for 20 minutes after melting thereby producing a mixture of cyanuric acid and cyamelide which is cooled by spraying into a flow of air or cooled then pulverized into a powder.

Example 4

About 100 parts by weight of granular biuret produced by heating urea, is mixed with 30 parts by weight of urea then heated to above the melting point of biuret to 120–160 degrees C. for 30 minutes, ammonia evolves from the mixture, thereby producing a a mixture of cyanuric acid and cyamelide which is cooled then pulverized into a powder.

Example 5

About 100 parts by weight of a mixture of granular cyanuric acid and cyamelide, produced by heating urea, are mixed with 20 parts by weight of urea then heated to 120–160 degree C. for 30 minutes, ammonia evolved from the mixture, thereby producing a mixture of cyanuric acid and cyamelide which is pulverized into a powder.

Example 6

About 100 parts by weight of the mixture of cyanuric acid and cyamelide compounds of example 2 is mixed with 25 parts by weight of phosphoric acid (75%) then heated to above the melting point of the mixture of cyanuric acid and cyamelide condensation compound for about 30 minutes thereby producing a cyanuric acid and cyamelide salts of phosphoric acid.

Example 7

Example 6 is modified by first reacting 5 parts by weight of boric acid with the 25 parts by weight of phosphoric acid thereby producing a boron-phosphate condensation compound and utilizing it in place of the phosphoric acid in example 6.

Example 8

Example 6 is modified wherein another phosphorus containing compound is utilized in place of phosphoric acid and selected from the list below:

a) pyrophosphoric acid
b) phosphinic acid
c) phosphorus trichloride
d) phosphorus oxytrichloride
e) phosphorus oxide
f) ammonium dihydrogen phosphate
g) mono-aluminum phosphate
h) dimethyl methyl phosphonate (DMMP)
i) dimethyl hydrogen phosphite
j) phenyl acid phosphate
k) methylchlorophosphine
l) phosphorus
m) phosphorus thiochloride
n) tris(2-chloropropyl) phosphate
o) triphenyl phosphite
p) tris 2-chloroethyl phosphite
q) triethyl phosphite
r) urea dihydrogen phosphate
s) diethyl phosphite
t) trimethyl phosphite
u) dibutyl pyrophosphoric acid
v) melamine hydrogen boron-phosphate
x) hypophosphorous acid
y) methyl amine salt of phosphoric acid
z) O,O-dimethyl hydrogen dithiophosphate Example 9

30 parts by weight of the melted mixture of cyanuric acid and cyamelide compounds of example 2 are added to 100 parts by weight of a polypropylene triol with: a 56 hydroxyl number and a mol wt. of 3000 thereby: producing a stable emulsion for use in the production of flame retardant polyurethane products.

Example 10

Example 1 is modified wherein 20 parts by weight of powdered dimelamine phosphate is added to and mixed in with the melted mixture of cyanuric acid and cyamelide compounds thereby producing a flame retardant amino condensation composition which is cooled and ground into a powder.

Example 11

Example 2 is modified wherein 25 parts by weight of melamine powder are added to and mixed in with the melted mixture of cyanuric acid and cyamelide compounds thereby producing a flame retardant mixture of cyanuric acid, cyamelide and melamine composition.

Example 12

100 parts by weight of the melted mixture of cyanuric acid and cyamelide of example 2, 50 parts by weight of melamine powder and 20 parts by weight of boric acid are mixed then heated up to 160 degree C. for 45 minutes while agitating. Ammonia evolves from the solution and heated at 110°–130° C. for 20–30 minutes thereby producing cyanuric acid, cyamelide and melamine salts of boric acid. The compound is cooled, then ground into a fine powder.

Example 13

100 parts by weight of the melted mixture of cyanuric acid and cyamelide of example 2, 30 parts by weight of dicyandiamide and 20 parts by weight of boric acid are mixed then heated up to 160 degree C. for 0.5 to 1 hour. Ammonia evolves from the mixture thereby producing a mixture of cyanuric acid, cyamelide and dicyadiamide salts of boric acid. The mixture is cooled then grown into a fine powder.

Example 14

100 parts by weight of the melted mixture of cyanuric acid and cyamelide of example 2, 30 parts by weight of melamine phosphate are mixed then heated up to 160 degree C. for 40 minutes thereby producing a flame retardant mixture of cyanuric acid, cyamelide and melamine salt of phosphate composition. After cooling it is ground into a fine powder.

Example 15

Example 13 is modified wherein 10 parts by weight of a phosphorus salt forming compound selected from the list below is added to and reacted with the mixture of cyanuric acid and cyamelide salt of boric acid;

a) phosphoric acid
b) pyrophosphoric acid
c) dimethyl methyl phosphonate (DMMP)
d) dimethyl hydrogen phosphite
e) trimethyl phosphite
f) phenyl acid phosphate
g) phosphorus trichloride
h) phosphinic acid
i) phosphorus oxytrichloride
j) ammonium dihydrogen phosphate
k) dimethyl phosphoric acid
l) diethyl ethyl phosphonate
m) magnesium hydrogen phosphate
n) mono aluminum phosphate

Example 16

100 parts by weight of the mixture of cyanuric acid and cyamelide are mixed with 25 parts by weight of a halogenated flame retardant compound selected from the list thereby producing a flame retardant composition:

a) brominated epoxy olgmer
b) decabromodiphenyl oxide
c) pentabromodiphenyl oxide
d) 2,3-dibromopropanol
e) octabromodiphenyl oxide
f) tris (dichloropropyl) phosphite
g) tris(dichloropropyl) phosphite

Example 17

Example 4 is modified wherein 20 parts by weight of a powdered filler selected from the list below is mixed with the powdered mixture cyanuric acid and cyamelide compounds thereby producing a flame retardant composition:

a) hydrated aluminum oxide powder
b) hydrated sodium silicate powder
c) melamine
d) dicyandiamide
e) urea
f) melamine phosphate
g) melamine borate
h) ammonium phosphate
i) ammonium pyrophosphate
j) ammonium carbonate
k) ammonium borate
l) ammonium sulfamate
m) guanidine
n) guanidine carbonate
o) urea phosphate
p) silica powder
q) phenol-formaldehyde resin powder
r) aluminum phosphate
s) thiourea
t) hollow beads
u) expandable graphite
v) melamine salt of DMMP
r) ammonium sulfate
s) magnesium chloride
t) antimony trioxide
u) boron-phosphate powder
w) melamine boron-phosphate powder
x) ammonium boron-phosphate powder

Example 18

30 parts by weight of the mixture of cyanuric acid and cyamelide compounds of example 2 are mixed and reacted with 10 parts by weight of dimethyl methyl phosphonate (DMMP) thereby producing a mixture of cyanuric acid and cyamelide salts of DMMP, then it was added and mixed with 60 parts by weight of a flexible polyepoxy resins with its polyamine curing agent. The resin is cured then was tested with a 2" propane flame held against the sample for 1 minute. The flame did not spread and the flame went out when the torch was removed. There was about a 2% weight loss.

Example 19

30 parts by weight of the of mixture of cyanuric acid and cyamelide salts of dimethyl methyl phosphonate of example 8h are mixed with 100 parts by weight of a flexible polyester resin containing its catalyst. The resin is cured then flame tested using a propane torch with a 2" flame held against the sample for 1 minute. The flame did not spread and went out when the torch was removed. There was about a 2% weight loss.

Example 20

20 parts by weight of the mixture of cyanuric acid and cyamelide and 5 parts by weight of dimethyl hydrogen phosphonate are incorporated into 70 parts by weight of a flexible polyurethane foam produced from MDI and a triol which weighs about 1.75 lbs./cu.ft. The foam was flame tested by using Calif. TB 133 Test wherein 100 gms of wood is burned on top of the foam. After burning the wood on the foam there was a 50.5 gms weight loss. A weight loss of less than 60 gms is necessary to pass the test. This foam was flame tested using a ½"×2"×6" sample hung vertically, then a 2" propane torch flame was placed at the bottom of the sample for 1 minute. The flame did not spread and the foam melted without burning.

Example 21

30 parts by weight of the composition of example 14 are incorporated in 50 parts by weight of a rigid polyurethane foam of about 2 lbs./cu.ft., produced using polymeric MDI and aromatic polyester polyol. The rigid polyurethane foam was flame tested using a propane torch that had a 2" flame held against the foam. The flame did not spread and went out when the torch was removed. There was about a 4% weight loss.

Example 22

Example 14 is modified wherein another amino phosphorus containing compounds is selected from the list below and utilized in place of melamine phosphate:

--- a) dimelamine phosphate
b) dicyandiamide phosphate
c) urea dihydrogen phosphate
d) guanidine phosphate
e) aminoguanidine phosphate
f) diethyltriamine urea phosphate
g) melamine salt of dimethyl methyl phosphonate
h) melamine salt of dimethyl hydrogen phosphite
i) methylamine melamine phosphoric acid
j) methyl carbamate salt of phosphoric acid
k) melamine salt of boron-hydrogen phosphate
l) O-methyl urea
m) urea salt of boron-phosphate
n) urea-formaldehyde phosphate
o) aminophenol phosphate
p) ammonium urea phosphate
q) ammonium melamine phosphate
r) melamine salt of trimethyl phosphite
s) melamine salt of phenyl acid phosphate

---

Example 23

About 55 parts by weight of the powdered mixture cyanuric acid and cyamelide compounds produced in Example 2, 100 parts by weight of triol component (Daloflex XES 11870 by ICI of Europe) and 60 parts by weight of diphenymethane4,4'-diisocyanate (Suprasec 2424 by ICI) were mixed and foamed into a flexible foam of about 1.5 lbs./cu. ft. After the foam cured for 1 week it was flame tested using Calif. TB 133. The foam sample passed this test with a 44 gms weight loss. Europe's UL94 HF-1, HF-2 flame test were done using a 2 cm flame from a propane torch for 1 minute placed under the ½"×2"×6" sample. This foam passed the test. The sample did not catch on fire and the melted drips did not catch on fire.

Example 24

Example 23 is modified wherein another mixture of compounds are use in place of the one produced in example 2 and selected from the list below:

a) 55 parts by weight of the mixture of compounds of Example 1.
b) 47 parts by weight of compounds of Example 3.
c) 45 parts by weight of compound of example 4.
d) 50 parts by weight of compound of example 5.

The above examples were flame tested using Calif. TB 133 and UL 94 HF-1, HF-2 and all passed the tests.

Example 25

Example 23 was modified wherein a comparison test was done using 45 parts by weight of powdered melamine in place of the mixture of cyanuric acid and cyamelide compounds. A sample of this foam failed the Calif. TB 133 test.

Example 26

15 parts by weight of of the mixture of cyanuric acid and cyamelide compounds of Example 4 anc 5 parts by weight of dimethyl methyl phosphonate, 15 parts by weight of a polyol component (Pro-Design B by 3M) and 30 parts by weight of a MDI prepolymer (Pro-Design A by 3M) are mixed and poured into a mold thereby forming a solid flame retarded polyurethane sample ⅛"×2"×6". This sample was flame tested for 1 minute using a 2" propane flame. The flame was place under a vertical strip of this sample. The flame did not spread and there was about a 2% weight loss.

Example 27

Example 23 was modified where in 20 parts by weight of sucrose amine polyol with a hydroxyl No. of 357 was used in place of the polyol component and 22 parts by weight of polymeric MDI (Mondur by Miles) was used in place of the MDI prepolymer thereby producing a rigid flame retarded polyurethane foam.

Example 28

200 parts by weight of sucrose amine polyol, hydroxyl No. 350, 30 parts by weight of dimethyl methyl phosphonate, 6 parts by weight of water, 0.1 part by weight of amine catalyst (Dabco R8020 by Air Products), 0.05 parts by weight of tin catalyst (Dabco T-12 by Air Products) 150 parts by weight of the mixture of cyanuric acid and cyamelide compounds of Example 1 and 220 parts by weight of Diphenymethane-4,4'-diisocyanate are mixed then poured into a mold. A rigid foam of about 2 lbs./cu. ft. is form ed. After 1 week this foam is flame tested with a 2" propane flame by placing the flame at the bottom of a ½"×2"×6" sample for 1 minute. The flame did not spread and the flame went out when the flame was removed. A char was formed and there was about a 4% weight loss.

Example 29

Example 28 is modified wherein another polyol is used in place of the sucrose amine polyol and selected from the list below:

a) sucrose amine polyol, hydroxyl No. 530 with 25% polypropylene polyol, hydroxyl No. 450;
b) aromatic amino polyol, hydroxyl No. 530 with 25% polypropylene polyol, hydroxyl No. 650;
c) aromatic polyester polyol, hydroxyl No. 350;
d) sucrose polyol, hydroxyl No. 450;
e) phosphorus polyol (VIRCOL 82 by Albright and Wilson).

These samples were tested as above with same good results.

Example 30

Example 28 is modified wherein another polyisocyanate is used in place of the MDI and selected from the list below:

a) polymeric MDI (Mondur MR by Miles)
b) polymeric MDI (PAPI 27 by Dow)
c) polymeric MDI (Mondur MRS).

Example 31

100 parts by weight of ethylene modified polypropylene glycol (Multranol 7056 by Miles), 30 parts by weight of the powdered mixture of cyanuric acid and cyamelide compounds of Example 1 and 10 parts by weight of melamine phosphate, 3 parts by weight of water, 1 part by weight of silicone surfactant (L6202 by Union Carbide) and 50 parts by weight of TDI (Mondur TD80) are mixed then poured into a mold. A flame retardant flexible foam of about a 1.5 lbs./cu.ft. The foam was cured for 1 week then flame tested with a 2" propane flame placed under a ½"×2"×6" sample (UL94-1,HF-2 TEST). The flame did not spread and the melted drippings did not bum.

Example 32

Example 31 is modified wherein another mixture of cyanuric acid and cyamelide compounds are used in place the one produced in Example 1 and selected from the list below:
  a) cyanuric acid and cyamelide compounds of Example 2;
  b) cyanuric acid and cyamelide compounds of Example 3;
  c) cyanuric acid and cyamelide compounds of Example 4;
  d) cyanuric acid and cyamelide compounds of Example 5;
  e) cyanuric acid and cyamelide salts of phosphoric acid of Example 6;.

The above examples were flame tested as in Example 31 with good results.

Example 33

Example 31 is modified wherein a carbonization agent is added to the polyol in the amount of 15 parts by weight and selected from the list below:

--- a) diaminophosphate
  b) dimethyl methyl phosphonate
  c) urea phosphate
  d) melamine borate
  e) ammonium melamine boron phosphate
  f) diethyl phosphite
  g) ammonium polyphosphate
  h) dicyandimide phosphate
  i) ammonium phosphate
  j) aluminum phosphate
  k) tris2-chloroethyl phosphite
  l) zinc borate
  m) boron oxide
  n) boric acid
  o) dimethyl phosphiteg
  p) triethyl phosphate
  q) guanidine phosphate
  r) ammonium sulfamate

---

These examples were tested as in Example 31 and passed this test.

Example 34

30 parts by weight of the powdered mixture of cyanuric acid and cyamelide compounds produced in Example 1 and 100 parts by weight an aqueous emulsion containing 50 % vinyl acetate were mixed then poured into a mold to form a ⅛" thick sample. After the sample was thoroughly dried the sample was flamed tested by using a 2" propane flame held against it for 1 minute. The flame did not spread and went out when the flame was removed.

Example 35

Example 34 is modified wherein the mixture of cyanuric acid and cyamelide compounds are replaced with compounds selected from the list below:
  a) the mixture of cyanuric acid and cyamelide compounds produced in Example 2;
  b) the mixture of cyanuric acid and cyamelide compounds produced in Example 3;
  c) the mixture of cyanuric acid and cyamelide compounds produced in,Example 4;
  d) cyanuric acid and cyamelide salts of phosphoric acid produced in Example 5;
  e) cyanuric acid and cyamelide salts of boron-phosphate produced in Example 7.

These samples were tested as in Example 31 with same good results

Example 36

Example 34 is modified wherein the vinyl acetate emulsion is replaced with another emulsion containing 50% by weight of a plastic or natural products listed below;
  a) vinyl acetate-ethylene copolymer (Airflex RP-226 by Air Products)
  b) vinyl acetate-ethylene copolymer (Airflex RP-245 by Air Products)
  c) phenol-formaldehyde resin
  d) acrylic enamel paint
  e) acrylic latex paint
  f) methyl methyl acrylate
  g) acrylic acid
  h) polyurethane
  i) polyester resin
  j) epoxy resin
  k) starch
  l) modified starch
  m) polyvinyl chloride
  n) polyvinyl chloride-vinyl acetate copolymer
  o) polystyrene
  p) polyamide from vegetable protein
  q) nylon
  r) rubber latex
  s) polybutadiene-styrene copolymer These samples were tested as in Example 31 and gave the same good results.

Example 37

Example 31 is modified wherein the aqueous emulsion is replaced with an organic solvent containing a solution or emulsion of the plastic or natural product listed in Example 36 then flame tested. These samples were tested as in Example 31 and gave the good flame retardant results.

Example 38

200 parts by weight of polyethylene is melted then 50 parts by weight of the mixture of cyanuric acid and cyamelide salts of phosphoric acid produced in Example 5 are added and mixed with the melted polyethylene. The cyanuric acid and cyamelide phosphate compounds melts and is thoroughly mixed with the melted polyethylene, then the mixture is poured into a mold to form a ⅛" thick sample when cooled. The cooled sample is flame tested using a 2" propane flame held at the bottom of the sample for three 10 seconds periods minute. The flame retardant polyethylene melts but the flame does not spread and went out when the flame was removed. The melted polyethylene does not bum as it drips.

Example 39

Example 38 is modified wherein another compound is utilized in place of the cyanuric acid and cyamelide phosphate compound produced in Example 5 and is selected from the list below:
a) cyanuric acid and cyamelide salt of boron-phosphate produced in Example 7;
b) cyanuric acid and cyamelide produced in Example 3;
c) cyanuric acid and cyamelide compounds produced in Example 4;
d) mixture of cyanuric acid and cyamelide plus dimethyl hydrogen phosphonate produced in example 8i;
e) cyanuric acid and cyamelide plus dinelamine phosphate as produced in Example 10;
f) cyanuric acid and cyamelide plus ammonium urea phosphate produced, in Example 22p.
g) cyanuric acid and cyamelide plus dimethyl hydrogen phosphonate produced in Example 8i.
h) cyanuric acid and cyamelide plus melamine produced in Example 11;
i) cyanuric acid and cyamelide salt of boric acid as produced in example 13.
j) cynuric acid and cyamelide salt of dimethyl methl phosphonate produced in Example 18;
k) cyanuric acid and cyamelide plus melamine salt of dimethyl hydrogen phosphite produced In example 22h.

These samples were tested as in Example with the same good results.

Example 40

Example 38 is modified wherein another plastic is utilized in place of polyethylene and selected from the list below:
a) ethylene vinyl acetate copolymer
b) polyester polyol (solid)
c) polyamide
d) vinyl acetate-ethylene copolymer (Airflex RP 226 by Air Products)
e) vinyl acetate-ethylene copolymer (Airflex RP 245 by Air products)
f) polystyrene
g) polyester hot glue
h) polyurethane flexible foam melted.

These samples were tested as in Example 43 and produced the same good results.

Example 41

30parts by weight of a mixture of cyauric acid and cyamelide compounds produced in Example 1, are added to an aqueous emulsion of 100 parts by weight of styrene monomer, then a catalytic amount of potassium persulfate and ferric sulfate is added. The mixture is agitated for several hours until the styrene polymerizes. The aqueous emulsion of flame retardant polystyrene is poured into mold and allowed to dry. The dried plastic is then flame tested utilizing a 2" propane flame which is placed under and touch the plastic for three 10 seconds periods. The flame did not spread and did not burn when the flame was removed.

Example 42

Example 41 is modified wherein another plastic monomer is utilized in place of styrene monomer and selected from the list below:
a) acrylic acid monomer
b) methyl acrylic acid monomer with redox system
c) vinyl acetate monomer
d) vinyl chloride monomer with redox system
e) vinylidene chloride monomer with redox system
f) methyl acrylate monomer with redox system.
g) acrylonitrile monomer with redox system
h) isoprene monomer
i) chloroprene monomer
j) butadiene with acrylonitrile
k) butadiene with styrene
l) N-vinyl pyrrolidone monomer with hydrogen peroxide
m) polyvinyl pyridine monomer
n) vinylidene chloride with vinyl chloride.

These samples were tested as in Example 46 with the same good results.

Example 43

Example 41 is modified wherein another compound is utilized and selected from the list below:;
a) 30 parts by weight of the mixture of cyanuric acid and cyamelide produced in Example 2 and 20 parts by weight of cyclic phosphonate (ANTIBLAZE N produced by Albright & Wilson);
b) 40 parts by weight of a mixture of cyanuric acid and cyamelide compoundc produced in example 3 and 10 parts by weight of ammonium polyphosphorate.
c) 35 parts by weight of the mixture of cyanuric acid and cyamelide compounds produced in example 4 and 15 parts by weight of a cyclic phosphonate (ANTIBLAZE 1045 by Albright & Wilson;
d) 40 parts by weight of the mixture of cyanuric acid and cyamelide compounds produced in example 5 and 10 parts by weight of diammonium borate;
e) 48 parts by weight of cyanuric acid and cyamelide salt of phosphoric acid compounds produced in Example 6, 1 part by weight of titanium oxide powder and 1 part by weight of zinc borate.

These samples were tested as in Example 38 and produced the same good results.

CONCLUSION

It is surprising that the heating of urea to form a mixture cyanuric acid and cyamelide compounds greatly increase their flame retardant properties and in most cases are better flame retardant compounds than melamine, and are much better in flame retarding than urea, biuret, and other amino compounds. The addition of the carbonization agents increases the development of an insulating carbon char which helps the materials to resist further degradation and thereby further exposure to flame. A plastic foam for example, which contains this mixture of cyanuric acid and cyamelide composition resist melting when exposed to heat. The melted drippings of the material being flame tested is reduced, and any burning is minimized. There is a lesser amount of smoke given off these flame retardant material when flame tested.

These flame retardant mixture of cyanuric acid and cyamelide compounds and their salts and formaldehyde resins, have many uses such as being added to adhesives in the production of pressed wood, plywood chipboard, etc, in flame retardant paints and varnishes, for flame retarding plastics and polyurethane foams and reacts with aldehydes to produce resins.

It will be appreciated by those skilled in the Arts that changes and modifications of the preferred embodiment can be made without departing from the spirit and broader aspects of the invention as set forth in the appended Claims.

I claim:

1. A method for reducing combustibility of a more flammable organic material comprising incorporating a cyanuric acid and cyamelide composition and/or its aldehyde resin reaction product on or in the more flammable organic material, under reaction conditions of the more flammable organic material, said cyanuric acid and cyamelide composition and/or its aldehyde resin reaction product produced by the method of mixing, heating and reacting the following components:

(A) cyanuric acid and cyamelide, in the amount of 100 parts by weight of cyanuric acid and cyamelide;

(B) aldehyde, in an amount of 0 to 200 parts by weight of aldehyde;

(C) carbonization auxiliaries, in the amount of 0 to 30 parts by weight of carbonization auxiliaries; then mix (D) metal containing compound that accelerates carbonization, in the amount of 0 to 30 parts by weight of metal containing compound;

(E) heat reflecting compound, in the amount of 0 to 30 parts by weight of heat reflecting compound;

(F) filler, in the amount of 0 to 300 parts by weight of filler; component A and component B are mixed heated and reacted thereby producing a cyanuric acid and cyamelide-aldehyde resin, then components C, D, E and F are added then mixed.

2. The method of claim 1 wherein the flame retardant composition is a mixture of cyanuric acid and cyamelide.

3. The product produced by the method of claim 1.

4. A flame retardant composition produced by applying on or incorporating a mixture of cyanuric acid and cyamelide compounds in a more flammable organic material, under reaction conditions and in an amount sufficient to reduce the combustibility of the more flammable organic material.

5. A flame retardant composition produced by incorporating a flame retardant mixture of cyanuric acid and cyamnelide compounds and/or its aldehyde resin reaction product on or in a more flammable organic material, under reaction conditions and in an amount sufficient to reduce the combustibility of more flammable organic material, said cyanuric acid and cyarnelide composition and/or its aldehyde resin reaction product is produced by the process comprising of mixing or mixing heating and reacting the following components:

(A) cyanuric acid and cyamelide,in the amount of 100 parts by weight of cyanuric acid and cyamelide;

(B) aldehyde, in the amount of 0 to 200 parts by weight of aldehyde;

(C) carbonization auxiliaries, in the amount of 0 to 300 parts by weight of carbonization auxiliaries;

(D) metal containing compound that accelerates carbonization, in the amount of 0 to 30 parts by weight of metal containing compound;

(E) Heat reflecting compounds, in the amount of 0 to 30 parts by weight of heat reflecting compound;

(F) filer; in the amount of 0 to 300 parts by weight of filler; component A and component B are added, mixed and reacted, thereby producing a cyanuric and cyamnelide-aldehyde resin then component C, D, E and F are added and mixed.

6. The flame retardant composition of claim 5 wherein the aldehyde is an aqueous formaldehyde, in the amount of 0 to 200 parts by weight of formaldehyde.

7. The flame retardant composition of claim 5 wherein the carbonization auxiliaries are selected from the group consisting of phosphorus containing compounds, boron containing compounds, boron-phosphate containing compounds and sulfur containing compounds that produce acidic components in the pyrolysis mixture, in an amount of 0 to 300 parts by weight.

8. The flame retardant composition of claim 5 wherein the metal containing compound that accelerates the carbonization is selected from the group consisting of zinc oxide, zinc thiocarbamate compounds, mercaptobenzothiazole zinc compounds, salicyaldehyde zinc compounds, zinc borate, alkaline earth metal borates and mixtures thereof.

9. The flame retardant composition of claim 5 wherein the filler is selected from the group consisting of urea, melamine, dicyandiamide, melamine cyanurate, amino phosphates, aminopolyphosphates, aminoplasts, phenoplasts, powdered synthetic resins, sawdust, carbohydrates, bituminous additives, graphite, graphite compounds, cyanuric derivatives or their formaldehyde resins, powdered coke, silica, alkali metal silicates, alkaline earth metal silicates, metals, metal silicates, oxides, carbonates, sulphates, phosphates and borates, glass beads, hollow glass beads, hydrated aluminum oxide and mixtures thereof, in an amount 0 to 300 parts by weight of filler.

10. The flame retardant composition of claim 5 wherein the aldehyde is an aqueous formaldehyde; in an amount 0 to 200 by the weight of formaldehyde.

11. The flame retardant composition of claim 5 wherein the cyanuric acid and cyamelide flame retardant composition is solublized in an amount of 3 to 200 percent by weight, percentage based on the weight of the more flammable organic material.

12. The flame retardant composition of claim 5 wherein the more flammable organic material is selected from the group consisting of polyurethanes, polyester resins, unsaturated polyester resins, polyepoxy resins, polycarbonates, polyamides, polyimides, polyester polyamide resins, polyacrylonitrile, vinyl polymers and copolymers, olefin polymers and copolymers, vinyl-olefin copolymers, polyphenylene, polysulfone, polyacetal, natural products and mixtures thereof.

13. The flame retardant composition of claim 5 wherein the mixture of cyanuric acid and cyamelide are reacted with the carbonization auxiliary, phosphoric acid, thereby producing a mixture of cyanuric acid and cyamelide salts of phosphoric acid and utilized as the flame retardant composition.

14. The flame retardant composition of claim 5 wherein the mixture of cyanuric acid and cyamelide are reacted with a carbonizaton agent, dimethyl hydrogen phosphite, thereby producing a mixture of cyanuric acid and cyamelide salts of dimethyl hydrogen phosphite, and utilized as the flame retardant composition.

15. The flame retardant composition of claim 5 wherein the mixture of cyanuric acid and cyamelide are reacted with a carbonization auxiliary, boric acid, thereby producing a mixture of cyanuric acid and cyamelide salts of boric acid.

16. The flame retardant composition of claim 5 wherein the carbonization auxiliaries is a phosphorus containing compounds that will react with the mixture of cyanuric acid and cyamelide compounds, that is reacted with the mixture of cyanuric acid and cyamelide compounds and utilized as the flame retardant compound in claim 1.

17. The flame retardant composition of claims 16 wherein the phosphorus containing compound is an phosphorus oxyacid compound thereby producing a mixture of cyanuric acid and cyamelide salts of phosphorus oxyacid.

18. The flame retardant composition of claim 17 wherein the phosphorus oxyacid compound is phosphoric acid.

19. The flame retardant composition of claim 16 wherein the phosphorus containing compound is an organic phosphorus containing compound.

20. The flame retardant composition of claim 19 wherein the organic phosphorus compound is dimethyl methyl phosphonate.

* * * * *